(12) United States Patent
Wittmann et al.

(10) Patent No.: US 8,119,246 B2
(45) Date of Patent: Feb. 21, 2012

(54) METHOD FOR PRODUCING A REFLECTIVE MEMBRANE AND THE MEMBRANE PRODUCED THEREWITH

(75) Inventors: Gabriele B. Wittmann, München (DE); Henricus J. M. Van De Ven, Arnhem (NL)

(73) Assignee: Sympatex Technologies GmbH, Unterföhring (DE)

( * ) Notice: Subject to any disclaimer, the term of this patent is extended or adjusted under 35 U.S.C. 154(b) by 939 days.

(21) Appl. No.: 11/991,375

(22) PCT Filed: Sep. 26, 2006

(86) PCT No.: PCT/EP2006/009306
§ 371 (c)(1),
(2), (4) Date: Mar. 3, 2008

(87) PCT Pub. No.: WO2007/039180
PCT Pub. Date: Apr. 12, 2007

(65) Prior Publication Data
US 2009/0226731 A1    Sep. 10, 2009

(30) Foreign Application Priority Data

Sep. 30, 2005  (EP) .................................... 05021475

(51) Int. Cl.
*B32B 15/095* (2006.01)
*B32B 37/14* (2006.01)
(52) U.S. Cl. ...................... 428/425.8; 428/458; 156/235
(58) Field of Classification Search ............... 428/425.8, 428/458; 156/235
See application file for complete search history.

(56) References Cited

U.S. PATENT DOCUMENTS

| 5,750,242 A | * | 5/1998 | Culler ........................... 428/209 |
| 2002/0049020 A1 | | 4/2002 | Van De Ven et al. |
| 2006/0099431 A1 | | 5/2006 | Scholz |
| 2006/0188558 A1 | * | 8/2006 | Jackson et al. ............... 424/449 |

FOREIGN PATENT DOCUMENTS

| DE | 43 22 512 A1 | 1/1994 |
| EP | 0 361 865 A2 | 4/1990 |
| EP | 1 184 482 A1 | 3/2002 |
| GB | 2 294 426 A | 5/1996 |
| WO | WO 98/12494 | 3/1998 |
| WO | WO 2004/020931 A1 | 3/2004 |

* cited by examiner

*Primary Examiner* — Thao T. Tran
(74) *Attorney, Agent, or Firm* — Oliff & Berridge, PLC

(57) ABSTRACT

Method for producing a reflective, waterproof, water-vapor permeable membrane, comprising the following steps,
Provision of a waterproof, water-vapor permeable membrane,
Provision of a carrier foil,
Application of the membrane onto the carrier foil,
Application of a metal surface onto the membrane's free surface via a vacuum sputtering process,
Application of a waterproof, water-vapor permeable cover layer,
Removal of the carrier foil.
Reflective, waterproof, water-vapor permeable membrane with a metal coating, which is provided with a continuous cover layer, characterized in that at least 80% of the surface of the active metal coating is retained on the membrane after 3 washings according to DIN EN ISO 6330:2000.

12 Claims, No Drawings

METHOD FOR PRODUCING A REFLECTIVE MEMBRANE AND THE MEMBRANE PRODUCED THEREWITH

The invention relates to a method for producing a reflective membrane and also to reflective membranes.

Reflective membranes are already known. For example, this type of membrane is known from WO 98/12494. This concerns a microporous membrane, upon which there is present a metal coating that covers the surface of the membrane and covers the pore walls at least partially. In order to protect the metal layer from oxidation, it is recommended that the entire membrane, including the pore walls, be provided with a cover layer in such a manner that the pores remain open. This entails a very complex process, as it must be ascertained that the cover layer covers the membrane surface and the membrane pore walls without interruption. As soon as interruptions in the cover layer are perceived, there results an insufficient protection for the metal layer. Additionally, the cover layer can detach at these points and block the membrane pores, so that a reduction in water-vapor permeability can result. For the protection of the pores, it would be additionally desirable if the cover layer could be continuously applied at least to the surface that has the metal coating. As will be described below, the protection of this type of cover layer is not sufficiently durable.

A membrane of this type is also known from EP 1 184 482 A1. This concerns a non-porous membrane in which water vapor molecules separate in the membrane and are transported through the membrane to the outside via a physical-chemical process. A metal layer and subsequently a cover layer are also applied here. These membranes are very thin, so that it is only possible with a great deal of effort to superimpose the metal coating and also the cover layer onto the membrane. Because the membrane is laminated, in any case, onto a textile fabric for its intended use, it has become usual in the meantime to coat the laminate consisting of the textile fabric and the membrane. However, it has been shown that the effective metal surface on the membrane is reduced to less than 80% after the first washing of the laminate at 40° C. This occurs apparently because the cover layer is broken open by the washing, and thus the cleansing agent can penetrate through the openings to the metal layer, whereby the metal layer in contact with the cleansing solution is oxidized or even partially washed away.

The object of the present invention is to provide a method for producing a reflective, waterproof, water-vapor permeable membrane, as well as a reflective membrane, whose cover layer is more stable and more durable. The object of the present invention is also to provide a reflective, waterproof, water-vapor permeable membrane in which the disadvantages described above are at least reduced.

The object according to the invention is achieved by a method for producing a reflective, waterproof, water-vapor permeable membrane that includes the following steps:
Provision of a waterproof, water-vapor permeable membrane,
Provision of a carrier foil,
Application of the membrane onto the carrier foil,
Application of a metal surface onto the membrane's free surface via a vacuum evaporation process,
Application of a waterproof, water-vapor permeable cover layer,
Removal of the carrier foil.

Surprisingly, it has been shown that the applied cover layer enters into a distinctly more stable connection with the metallic surface through the use of a carrier foil instead of a textile fabric, so that the membrane produced in this manner can be washed more often.

In the simplest case, the membrane can simply be laid onto the carrier foil, during which care must be taken to ensure that no air bubbles form between the membrane and the carrier foil. The adhesion generated by the electrostatic charge on the membrane and/or the carrier foil is generally sufficient to implement the method according to the invention.

It has been proven particularly favorable for the method according to the invention if the application of the membrane onto the carrier foil occurs through combined extrusion of a membrane material and a material for the carrier foil via a bicomponent nozzle. In this case, the materials should be selected from types such that the membrane material and the material for the carrier foil, even in the molten state, do not combine chemically or undergo an appreciable physical connection when they meet, so that it can be ensured that the carrier foil can be removed from the membrane after completion of the method according to the invention.

The method according to the invention distinguishes itself particularly when polyetherester, polyetheramide or polyetherurethane is used for the membrane material, and/or polyolefins, polypropylenes, polyvinylchlorides, polyethylenes, PTFE, polyesters or polyamides are used as material for the carrier foil.

It has proven particularly favorable if a water-vapor permeable polyurethane is used for the cover layer material. This has proven itself to be advantageous if the polyurethane is brought to a temperature of 120 to 200° C. within 0.1 to 5 sec following the application of the metal coating, and is maintained at this temperature until the polyurethane is fully cured.

The object according to the invention is also achieved by a reflective, waterproof, water-vapor permeable membrane with a metal coating, which is provided with a continuous cover layer, producible in accordance with the method according to the invention, which is distinguished in that at least 80% of the surface of the active metal coating is retained on the membrane after 3 washings, preferably after 5 washings, at 40° C. according to DIN EN ISO 6330:2000. This level of quality was previously, as described above, not achievable with a continuous formation of the cover layer.

The object according to the invention is also achieved by a reflective, waterproof, water-vapor permeable membrane with a metal coating, which is provided with a continuous cover layer, characterized in that at least 80% of the surface of the active metal coating is retained on the membrane after 3 washings, preferably after 5 washings, at 40° C. according to DIN EN ISO 6330:2000.

The cover layer of the membrane according to the invention preferably consists of a polyurethane.

The membrane according to the invention can consist of practically all materials that are suitable for producing waterproof, water-vapor permeable membranes. Preferably, however, the membranes according to the invention consist of polyetherester, polyetheramide or polyetherurethane.

In particular, aluminum, copper or silver has proven to be the best material for the reflective layer of the membrane according to the invention.

The invention will be explained in more detail on the basis of the following examples.

EXAMPLE 1

Comparison

A 15 μm thick, non-porous membrane made of copolyetherester was laminated on the one hand to a polyester non-woven fabric with a mass per unit area of 56 g/m² (laminate A) and on the other hand to a woven polyester with a mass per unit area of 115 g/m² (laminate B). The resulting laminates were each provided, according to the method described in EP 1 184 482, with a 60 nm thick aluminum layer and finally with a 1.25 µm thick polyurethane cover layer. These laminates were washed and spun-dry using a front-loading type A washer with a horizontally mounted drum at 41° C. and a phosphate free, ECE reference detergent A, and finally dried in accordance with method B, according to DIN EN ISO 6330:2000. After just one washing, only 59% of the surface of the aluminum layer on laminate A and a mere 44% on laminate B was active (the two layers differ in that the non-active surface is duller than that of the active layer). After 3 washings, only 47% of the surface of the aluminum layer on laminate A and 32% on laminate B was active.

EXAMPLE 2

According to the Invention

A two-layer sheet of copolyetherester and polypropylene was produced, with a 15 µm thick non-porous membrane made of copolyetherester and a 35 µm thick carrier foil made of polypropylene. Afterwards, the membrane side was provided, according to the method described in EP 1 184 482, with a 60 nm thick aluminum layer and finally with a 1.25 µm thick polyurethane cover layer. The membrane was then detached from the carrier foil and laminated on the one hand to a polyester non-woven fabric with a mass per unit area of 56 g/m² (laminate C) and on the other hand to a woven polyester with a mass per unit area of 115 g/m² (laminate D), in which the non-metalized side of the membrane was bonded with the polyester non-woven fabric or the woven polyester respectively. These laminates were washed and spun-dry using a front-loading type A washer with a horizontally mounted drum at 41° C. and a phosphate free, ECE reference detergent A, and finally dried in accordance with method B, according to DIN EN ISO 6330:2000. After one washing, 97% of the surface of the aluminum layer on laminate C and 96% of the surface on laminate D was still active. After 3 washings, 92% of the surface of the aluminum layer on laminate C and 91% on laminate D was still active, and after 5 washings, 87% on laminate C and 85% on laminate D.

The invention claimed is:

1. A method for producing a reflective, waterproof, water-vapor permeable membrane, comprising:
   providing a waterproof, water-vapor permeable membrane,
   providing a carrier foil,
   applying the membrane onto the carrier foil,
   applying a metal surface to the free surface of the membrane via a vacuum evaporation process,
   applying a continuous, waterproof, water-vapor permeable cover layer, and
   removing the carrier foil,
   whereby the method produces the reflective, waterproof, water-vapor permeable membrane.

2. The method according to claim 1, wherein applying the membrane onto the carrier foil occurs through combined extrusion of a membrane material and a material for the carrier foil via a bicomponent nozzle.

3. The method according to claim 1, wherein the membrane material is of a material selected from the group consisting of polyetherester, polyetheramide and polyetherurethane.

4. The method according to claim 1, wherein the carrier foil is of a material selected from the group consisting of polyolefins, polypropylenes, polyvinylchlorides, polyethylenes, PTFE, polyesters and polyamides.

5. The method according to claim 1, wherein the cover layer is a polyurethane that is water-vapor permeable.

6. The method according to claim 5, further comprising bringing the polyurethane to a temperature of 120 to 200° C. within 0.1 to 5 sec following applying the metal coating, and maintaining the polyurethane at this temperature until the polyurethane is fully cured.

7. A reflective, waterproof, water-vapor permeable membrane with a metal coating, which is provided with a continuous, waterproof, water-vapor permeable cover layer, produced according to the method in of claim 1, wherein at least 80% of the surface of the active metal coating remains on the membrane after 3 washings according to DIN EN ISO 6330:2000.

8. A reflective, waterproof, water-vapor permeable membrane with a metal coating, which is provided with a continuous cover layer, wherein the cover layer consists of a polyurethane, and at least 80% of the surface of the active metal coating remains on the membrane after 3 washings according to DIN EN ISO 6330:2000.

9. A reflective membrane according to claim 7, wherein at least 80% of the surface of the active metal coating is remains on the membrane after 5 washings according to DIN EN ISO 6330:2000.

10. A reflective membrane according to claim 7, wherein the cover layer consists of polyurethane.

11. A reflective membrane according to claim 7, wherein the membrane consists of polyetherester, polyetheramide or polyetherurethane.

12. A reflective membrane according to claim 7, wherein the metal coating consists of aluminum, copper or silver.

* * * * *